US006763232B1

(12) United States Patent
Odorfer et al.

(10) Patent No.: US 6,763,232 B1
(45) Date of Patent: Jul. 13, 2004

(54) COMMUNICATION SYSTEM AND SUITABLE PROCESS FOR RUNNING A COMMUNICATION SYSTEM

(75) Inventors: Thomas Odorfer, München (DE); Phil Lord, München (DE)

(73) Assignee: Viag Interkom GmbH & Co., Munich (DE)

( * ) Notice: Subject to any disclaimer, the term of this patent is extended or adjusted under 35 U.S.C. 154(b) by 0 days.

(21) Appl. No.: 09/743,129

(22) PCT Filed: Jul. 2, 1999

(86) PCT No.: PCT/DE99/02034

§ 371 (c)(1),
(2), (4) Date: Feb. 26, 2001

(87) PCT Pub. No.: WO00/02402

PCT Pub. Date: Jan. 13, 2000

(30) Foreign Application Priority Data

Jul. 3, 1998 (DE) .......................... 198 29 797

(51) Int. Cl.[7] .............................................. H04Q 7/20
(52) U.S. Cl. ............................. 455/432.1; 455/435.1; 455/558
(58) Field of Search .......................... 455/432.1, 432.2, 455/432.3, 558, 435.1

(56) References Cited

U.S. PATENT DOCUMENTS

| 3,581,019 A | 5/1971 | Ryan |
| 4,399,330 A | 8/1983 | Kuenzel |
| 4,736,094 A | 4/1988 | Yoshida |
| 4,737,928 A | 4/1988 | Parl et al. |
| 4,837,422 A | 6/1989 | Dethloff et al. |
| 4,868,846 A | 9/1989 | Kemppi |
| 5,568,153 A | 10/1996 | Beliveau |
| 5,678,186 A | 10/1997 | Lee |
| 5,839,071 A | 11/1998 | Johnson |
| 5,933,114 A | 8/1999 | Eizenhofer et al. |
| 5,940,756 A | 8/1999 | Sibecas et al. |
| 6,377,804 B1 * | 4/2002 | Lintulampi .............. 455/435.2 |
| 2002/0115438 A1 * | 8/2002 | D'Herbemont et al. ..... 455/435 |
| 2003/0073440 A1 * | 4/2003 | Mukherjee et al. ......... 455/435 |

FOREIGN PATENT DOCUMENTS

| DE | 3736854 A1 | 10/1987 |
| DE | 4107998 | 9/1992 |
| DE | 4317143 C2 | 5/1993 |
| DE | 4317149 A1 | 5/1993 |
| DE | 4417779 C1 | 5/1994 |
| DE | 4420462 A1 | 6/1994 |
| DE | 4424558 C2 | 7/1994 |
| DE | 69419261 T2 | 10/1994 |
| DE | 19511031 A1 | 3/1995 |
| DE | 19636730 A1 | 9/1996 |
| DE | 19713965 A1 | 4/1997 |

(List continued on next page.)

OTHER PUBLICATIONS

G. Mazziotto, The Subscriber Identy Module for the Digital Cellular System GSM, Fourth Nordic Seminar on Digital Mobile Radio Communications DMR IV, 1–9. Olso, Norway.

D. Chaum, Smart Card 2000, Selected Papers from the Second International Smart Card 2000 Conference, 92–107, Amsterdam, The Netherlands.

Primary Examiner—Lee Nguyen
Assistant Examiner—Un C Cho
(74) Attorney, Agent, or Firm—Cowan, Liebowitz & Latman, P.C.; Mark Montague

(57) ABSTRACT

A communication system and a process which create the possibility to guarantee undisturbed movements between areas belonging to different communication units, by assigning third subscriber identification data (IMSI-3) and second subscriber identification data (IMSI-VI) to a second subscriber data module (SIM-VI), and in which the third subscriber identification data (IMSI-3) and the second subscriber identification data (IMSI-VI) contain a common profile.

10 Claims, 1 Drawing Sheet

FOREIGN PATENT DOCUMENTS

| | | |
|---|---|---|
| DE | 19709407 A1 | 7/1997 |
| DE | 19729425 A1 | 7/1997 |
| DE | 19731461 C1 | 7/1997 |
| DE | 19731463 C1 | 7/1997 |
| EP | 0378450 | 1/1990 |
| EP | 0579655 B1 | 4/1992 |
| EP | 0669774 B1 | 2/1994 |
| EP | 0700628 B1 | 3/1994 |
| EP | 0744875 A2 | 11/1996 |
| FR | 2627880 | 1/1989 |
| WO | WO 92/19078 | 10/1992 |
| WO | WO 94/08433 | 4/1994 |
| WO | WO 95/20299 | 7/1995 |
| WO | WO 95/27382 | 10/1995 |
| WO | WO 96/04759 | 2/1996 |
| WO | WO 96/39000 | 12/1996 |
| WO | WO 97/28539 | 10/1997 |
| WO | WO 98/10614 | 3/1998 |
| WO | WO 98/24257 | 6/1998 |
| WO | WO 99/55107 | 10/1999 |

* cited by examiner

COMMUNICATION SYSTEM AND SUITABLE PROCESS FOR RUNNING A COMMUNICATION SYSTEM

FIELD OF THE INVENTION

The following invention concerns a communication system, particularly for a mobile telephone system, and a process for running a communication system.

The economic success, of operators or offerers of communication systems, hereinafter called communication unit, particularly depends on the offer, for example in the area intended, for example delimited by country borders, a complete coverage to their subscribers, who for example want to use a stationary or mobile telephone unit (hereinafter called user unit). For communication units that subsequently share a market in an area already covered by competitors (first communication unit), the problem arises, the competitors are not willing to accept the possibility of having a common use of the area being covered already by the competitors with agreements—so-called Roaming agreements. In order to be able to reach such a national coverage, for communication units entering subsequently in the competition or locally operating (second communication unit) two alternatives generally have developed that are known as "National roaming" and Indirect roaming".

In "National roaming" contracts are made between two communication units operating within a country border, that either allow one of the contract parties to use the network of the other contract party (unilateral case) or to both contract parties the right of using the other network connected to the contract party.

In contrast to this, in "Indirect roaming", agreements are made between two communication units of different countries, in which that communication unit (second communication unit) inside the country borders that is in search of a contract party outside the country borders is given the possibility, by means of this contract party (third communication unit) to acquire the use of the area inside the country borders which because of the impossibility of a national agreement would not be available to the second communication unit. In "Indirect roaming" thus no agreements between communication units situated inside country borders respectively national communication units are necessary.

In order to be able to offer to the user, because of the aforementioned contracts ("National roaming" or "Indirect Roaming" has the possibility) of an enlarged communication exchange, a comfort or service which is attractive or which has already been accepted by him, it is necessary to provide to the user (subscriber), when using the communication network connected to the other contract party, i.e. the first or third communication unit, the same functionality and services as if he was already using the communication network accepted by him and provided for example by the second communication unit.

In order to be able to fulfil this requirement, it has been proposed for example in WO 98/10614, to include on the subscriber data module (subscriber identity module; SIM card) foreseen for the user unit, corresponding subscriber data (international mobile subscriber identities, IMSI) with corresponding own profiles on several different subscriber data modules. In this case a user or subscriber who moved from the area of one communication unit to another area of the other communication unit, also had to change the corresponding subscriber data module, which is generally known as "Chip roaming" and which in everyday use was unsuitable for "Indirect roaming" purposes.

In order to avoid having several SIM cards, it has been proposed according to WO 92/19078, a SIM card with two corresponding subscriber data (IMSIs), which, according to the area and use of the communication unit, by turning the SIM card by 180° makes the use of two different communication units possible. This well-known process moreover for the subscriber has the consequence that for example in case of a change between the communication network visited by one communication unit and the communication network of the other communication unit, for example a home radio network, the SIM card has to be physically drawn out, turned over and reinserted. This, too, causes the subscriber discomfort and generally limits the handling.

In order to avoid these disadvantages it has already been proposed, also in WO 98/10614, to provide a special programme in the user unit and in the corresponding subscriber file (home location register HLR). With this programme to be installed in a fixed way, however, disadvantages or limitations have to be tolerated, namely that only a special user unit, adapted for it, has this programme, and thus it is clearly different from conventional user units, and that this well-known process is to be considered only semiautomatic. This installation of the programme both in the user unit and in the corresponding subscriber file is however not interesting for the offerer respectively for the communication unit, since the economic success of the communication unit depends on the decision of the consumer, for which use of the area included by the communication unit he opts, this decision of the consumer being influenced also by the range of different user units offered by the communication unit, which are sold together with a licence of the communication unit.

OBJECT AND SUMMARY OF THE INVENTION

Therefore the object of the present invention consists in providing a communication system and a process which prevent the aforementioned disadvantages and particularly which create the possibility to guarantee undisturbed movements between areas belonging to different communication units but nevertheless the same service of the single offerer or communication units used in case of a change.

These objects are solved, as far as the device is concerned, by the characteristics of claim 1 and as far as the process is concerned, by the characteristics of claim 7.

According to the invention in the communication system the third subscriber identification data assigned to a third communication unit and the second subscriber identification data assigned to a second communication unit are assigned to the second subscriber data module, so that according to the possible structure of the connection a total coverage of the communication units belonging to the second subscriber identification data and to the third subscriber identification data is possible, the third subscriber identification data and the second subscriber identification data containing a common profile, in order to offer to the subscriber the well-known service necessary for him. With this arrangement or fixation according to the invention on the second subscriber data module, it is guaranteed that the subscriber identification data, in each case matched to the single communication units, allow the access to the corresponding areas assigned to the communication units and possibly widened by roaming agreements, but that at the same time basic settings which are registered in the profile of the subscriber identification data and which the subscriber or user has got used to, can be called on both by the communication unit assigned to third subscriber identification data and by the communication unit assigned to second subscriber identification data. With this special arrangement on the subscriber data module it is guaranteed that a mechanical change or exchange of the subscriber data module like in the conventional case is not necessary.

There is thus the possibility of providing to subscribers of a second communication unit, by involving a third communication unit which has made a so-called Roaming contract with a first communication unit, an access to an area which made no "Roaming agreement" with the second communication unit. In this way an operator or a communication unit which still would like to set up in business and acquire market shares and has no or few Roaming contracts, has the possibility to offer his subscribers an access to other networks, which have made a multitude of roaming contracts and thus to cover areas that belong neither directly to the second communication unit nor to the third communication unit, and where for example a roaming contract between a first and a second communication unit for different reasons cannot be made.

The inventive concept both of the communication system and of the process suitable for it is only based on a direct registration in the SIM card and thus needs neither a modification in the user unit nor a special integration of a software or programme in the user unit or in the subscriber file.

If according to the invention the system is equipped with a first switching unit, which switches over from the second subscriber identification data to the third subscriber identification data when the user unit leaves the second area and enters the first area, then according to the invention the same service units and services are available to the subscriber as in the case of the second communication unit. The subscriber thus enjoys the already well-known and chosen comfort of the second communication unit. This first switching unit can be preferably formed as manual key, more precisely in such a way that after leaving the area assigned to the second communication unit, the subscriber has to input a special identification number (PIN 1), which takes the corresponding subscriber identification data out of the subscriber data module. For example the PIN numbers assigned to the single communication units, which are communicated to the subscriber, can serve to distinguish among the subscriber identification data of different communication units by just adding a fixed number or cipher, for example 1, which for example is added to the PIN number for the first communication unit. Thanks to this adding, respectively modifying a conventional PIN number, the selected communication unit can be recognized by the length of the PIN number. The subscriber moreover has the possibility to change the PIN numbers but not the number added to the PIN number. In order to simplify the handling, in case of change of a PIN number of a communication unit also the other PIN numbers of the other communication unit are modified, except the number or cipher added. In this way the subscriber is not forced to remember different PIN numbers belonging to the first, second or third communication units.

Further advantageous embodiments of the invention are subject of the depending claims.

If according to claim 2 the second area is a partial area of the first area and/or of the third area, the third area lying outside the first area, particularly the possibility of access of the subscribers of the second communication unit is widened, who could not make a national Roaming contract with the first communication unit, which for example can already boast the total coverage inside national country borders.

If in this case the third area moreover lies outside the first area, for example the national total coverage is made possible because of the first communication unit by means of the so-called "international roaming", if the first communication unit made a roaming contract with the third communication unit.

If according to claim 3 a second switching unit is provided, which switches over from the third subscriber identification data to the subscriber identification data when the user unit returns from the first area into the second area, in this embodiment a so-called automatic switching over is available, which further improves the comfort for the subscriber. This second key can be for example a trigger or a timer, which, based on information on the user unit, transmits information to the SIM card or to the second subscriber data module, so that the subscriber data module for example switches back from the third subscriber identification data to the second subscriber identification data. This trigger or timer can for example cause a multitude of actions, for example updating or changing of the file on the subscriber data module (elementary file, EF), setting of a temporal inquiry mode assigned to the timer or providing local information.

If according to claim 4 the second user unit is equipped with an inquiry algorithm with search mode, which periodically or after determined periods examines if the second user unit is situated in the second area, it is ensured that also in case of only short-time leaving the area a switch-over to the second communication unit is performed, as soon as the subscriber returns into the second area. According to the capacity of the user unit the frequency of the inquiry cycles can be adjusted. Too frequent inquiries could cause troubles if the search times for the inquiry mode become too long because of the too small size of the user unit.

If according to claim 5 the switching state of the second switching device is represented by the second user unit, it is up to the subscriber if he wants to wait as long as the second area is reached again or to dial the third communication unit.

If according to claim 6 the first, the second and /or the third user unit has the form of a mobile telephone, the communication system respectively the process suitable for it is used in the best way.

More extensive advantageous embodiments of the invention are subject of the remaining sub-claims.

BRIEF DESCRIPTION OF THE DRAWING

With reference to the following figure a particularly advantageous embodiment is explained more in detail.

With FIG. 1 a switching over within the scope of a so-called "easy-switching" with direct display on the second user unit is presented.

DETAILED DESCRIPTION OF THE INVENTION

Figure 1:
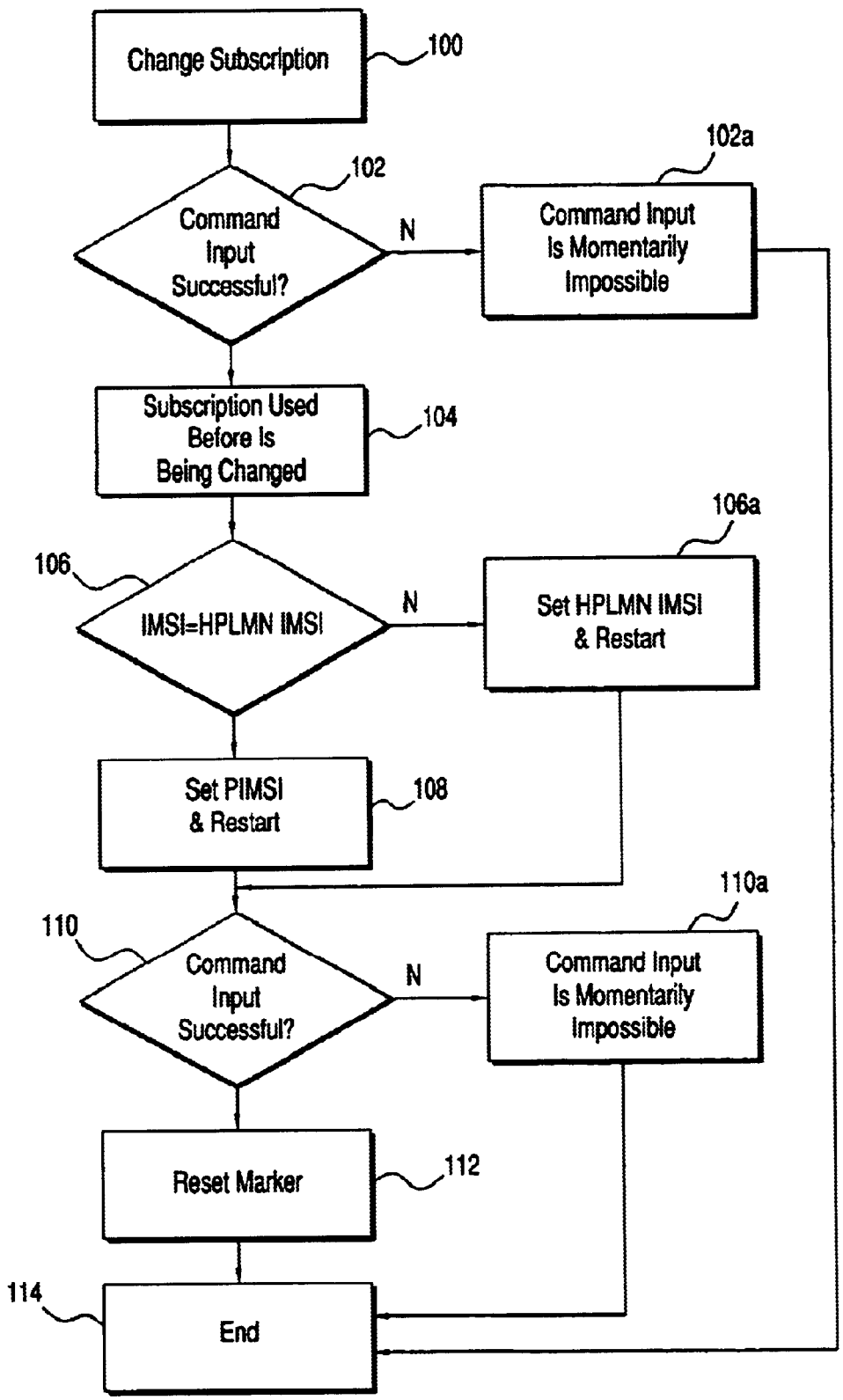

For the illustration of this realization form, in the following the changing of communication units, automatic or supported by display, simplified by the invention, is represented by means of a flowchart.

According to FIG. 1 for example when the subscriber leaves the second area, it is displayed to him that now a change of the subscription is necessary in order to be able to communicate. For this purpose according to step 100 "Change subscription" is displayed, in which the display itself can for example be changed individually by each communication unit. In the step 102 it is asked if a command input has successfully happened. If not, in the step 102a the text. "This command input is momentarily impossible" appears, and step 114 "End" follows directly. If step 102 is answered positively, according to step 104 a display text appears. "Subscription used before is being changed" and step 106 follows. Step 106 examines which subscriber identification data are accessible. If for example the second subscriber identification data do not exist as home subscriber identification data (HPLMN), step 106a follows and here the home subscriber identification data are set as momentarily active second subscriber identification data and a restart is performed. If step 106 is answered in the negative, in step 108 the third subscriber identification data are set as partner subscriber identification data (PPLMN) and a restart is performed. In step 110 it is inspected if the command input was successfully performed. If step 110 is answered in the negative, a display text according to step 110a communicates to the user that the command input momentarily is not possible, and the end follows. If step 110 is answered in the affirmative, the marker in step 112, which at the beginning indicated that the second area is being left, is reset and step 112 finishes the operation.

A modification of the profile of the subscriber identification data thus is not necessary and the subscriber can use the complete service of his home communication unit without problems.

Having described a specific preferred embodiment of the present invention with reference to the accompanying drawing, it is to be understood that the invention is not limited to that precise embodiment, and that various changes and modifications may be effected therein by one skilled in the art without departing from the scope or spirit of the invention as defined in the appended claims.

What is claimed is:

1. Communication system, for a mobile telephone system, comprising: at least one first communication unit (V-1), which provides a first area by a first user unit (MS-1) with first subscriber identification data (IMSI-1) controlled by a first subscriber data module (SIM-1), and at least one second communication unit (V-VI), which provides a second area by a second user unit (MS-VI) with second subscriber identification data (IMSI-VI) controlled by a second subscriber data module (SIM-VI), a third communication unit (V-3), which provides a third area by a third user unit (MS-3) with third subscriber identification data (IMSI-3) controlled by a third subscriber data module (SIM-3), in which the first communication unit (V-1) and the third communication unit (V3) are connected to each other for using a total area consisting of the first area and the third area, and at least the second communication unit (V-VI) is connected with the third communication unit (V-3) for using a total area consisting of the second area and the third area, wherein the third subscriber identification data (IMSI-3) and the second subscriber identification data (IMSI-VI) are assigned to the second subscriber data module (SIM-VI) and the third subscriber identification data (IMSI-3) and the second subscriber identification data (IMSI-VI) contain a common profile, in order to provide to the subscriber the necessary and well-known service, and that a first switching unit is provided, which switches over from the second subscriber identification data (IMSI-VI) to the third subscriber identification data (IMSI3) when the second user unit (MS-VI) leaves the second area and enters the first area, to every communication unit being assigned an own PIN number, which differs from the PIN number of the first communication unit (V-1) by an additional cipher and is recognized by the first switching unit.

2. System according to claim 1, wherein the second area is a partial area of the first area and/or the third area lies outside of the first area.

3. System according claim 1, further comprising a second switching unit is provided; which switches over from the third subscriber identification data (IMSI-3) to the second subscriber identification data (IMSI-VI) when the second user unit (MS-VI) returns from the first area into the second subscriber area.

4. System according to claim 3, wherein the second switching unit in the second user unit (MS-VI) and contains an inquiry algorithm with search mode which periodically examines if the second user unit (MS-VI) is situated in the second area.

5. System according to claim 4, wherein the switching state of the second switching unit is represented by the second user unit (MS-V1).

6. System according to claim 1, wherein the first, second and/or the third user unit has the form of a mobile telephone.

7. Method for operating a communication system, comprising the steps of:

a) providing a first communication unit (V-1), a second communication unit (V-VI) and a third communication unit (V-3), which in each case provide a first area with first subscriber identification data, a second area with second subscriber identification data and a third area with third subscriber identification data;

b) producing a link between the second communication unit (VVI) with the third communication unit (V-3) for using of a total area consisting in the second area and the third area, in which the third subscriber identification data (IMSI-3) and the second subscriber identification data (IMSI-VI) contain a common profile, in order to provide to the subscriber the necessary and well-known service, and c) switching over from the second subscriber identification data (IMSI-V1) to the third subscriber identification data (IMSI-3) when the user unit (MS-VI) leaves the second area and enters the third area, in which the switching over happens by means of inputting an own PIN number for the respective communication unit, and the PIN number of the respective communication unit differs from the PIN number of the first communication unit (V-1) by an additional cipher.

8. Process according to claim 7, wherein a switching over is provided by a second switching unit, which switches over from the third subscriber identification data (IMSI-3) to the second subscriber identification data (IMSI-VI), when the user unit (MS-VI) returns from the first area into the second area.

9. Process according to claim 7, wherein an inquiry algorithm with search mode periodically examines if the second user unit (MS-VI) is situated in the second area.

10. Process according to claim 7, wherein the second area is a partial area of the first area and/or the third area lies outside of the first area.

* * * * *